United States Patent [19]
Leonard

[11] 3,822,630
[45] July 9, 1974

[54] MUSIC TEACHING AID BASED ON THE HANDS AND SCALE DEGREES

[76] Inventor: Verna M. Leonard, 6353 N. Blackstone, Fresno, Calif. 93721

[22] Filed: Feb. 8, 1973

[21] Appl. No.: 330,693

[52] U.S. Cl. ................................................. 84/471
[51] Int. Cl. ............................................ G09b 15/02
[58] Field of Search ............ 84/470, 471, 472, 477, 84/478, 483, 485

[56] References Cited
UNITED STATES PATENTS

| | | | |
|---|---|---|---|
| 1,137,394 | 4/1915 | Fowler | 84/478 |
| 2,072,511 | 3/1937 | Ross | 84/470 |
| 3,208,327 | 9/1965 | Allen | 84/471 |
| 3,395,600 | 8/1968 | Leonard | 84/478 |
| R24,195 | 8/1956 | Wallace | 84/478 |

FOREIGN PATENTS OR APPLICATIONS

| | | | |
|---|---|---|---|
| 25,848 | 3/1953 | Finland | 84/485 |

Primary Examiner—Lawrence R. Franklin
Attorney, Agent, or Firm—Roy L. Knox

[57] ABSTRACT

A device for teaching elementary musical relationships and notation particularly in regard to scale tones and chords and uniquely associated with pre-known names and order of the user's fingers on both hands. Incidentally the same numbering of the fingers, from left to right in each also teaches, by assocation, the first five degrees by numerical name. The two hands are on a panel which also supports one of a set of strip inserts carrying, for example, treble and bass clef notation for a particular key signature and the first five, or lower five, notes or tones of that diatonic scale, it being proposed that the student will ordinarily have no difficulty whatever in extrapolating the "mini-scale" of five tones to the full octave and then to octaves above and below that learned by use of the device. For teaching chords a pair of hands are provided with three fingers only on each hand denominated as Root, 3rd and 5th degree and also correlated as before with fingers named in that order, left to right so that the Root tone is associated with the little finger of left hand for the bass clef and the thumb of the right hand for the treble clef, the remaining tones following in this natural learning order, and every finger visually related with the corresponding notation by lead lines of obvious significance to the user.

3 Claims, 3 Drawing Figures

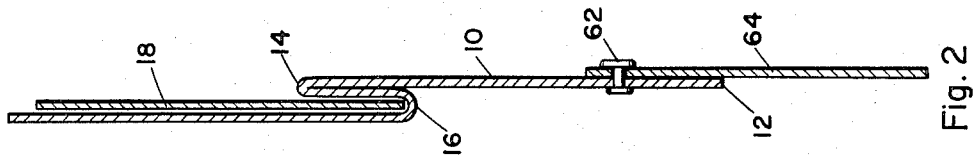
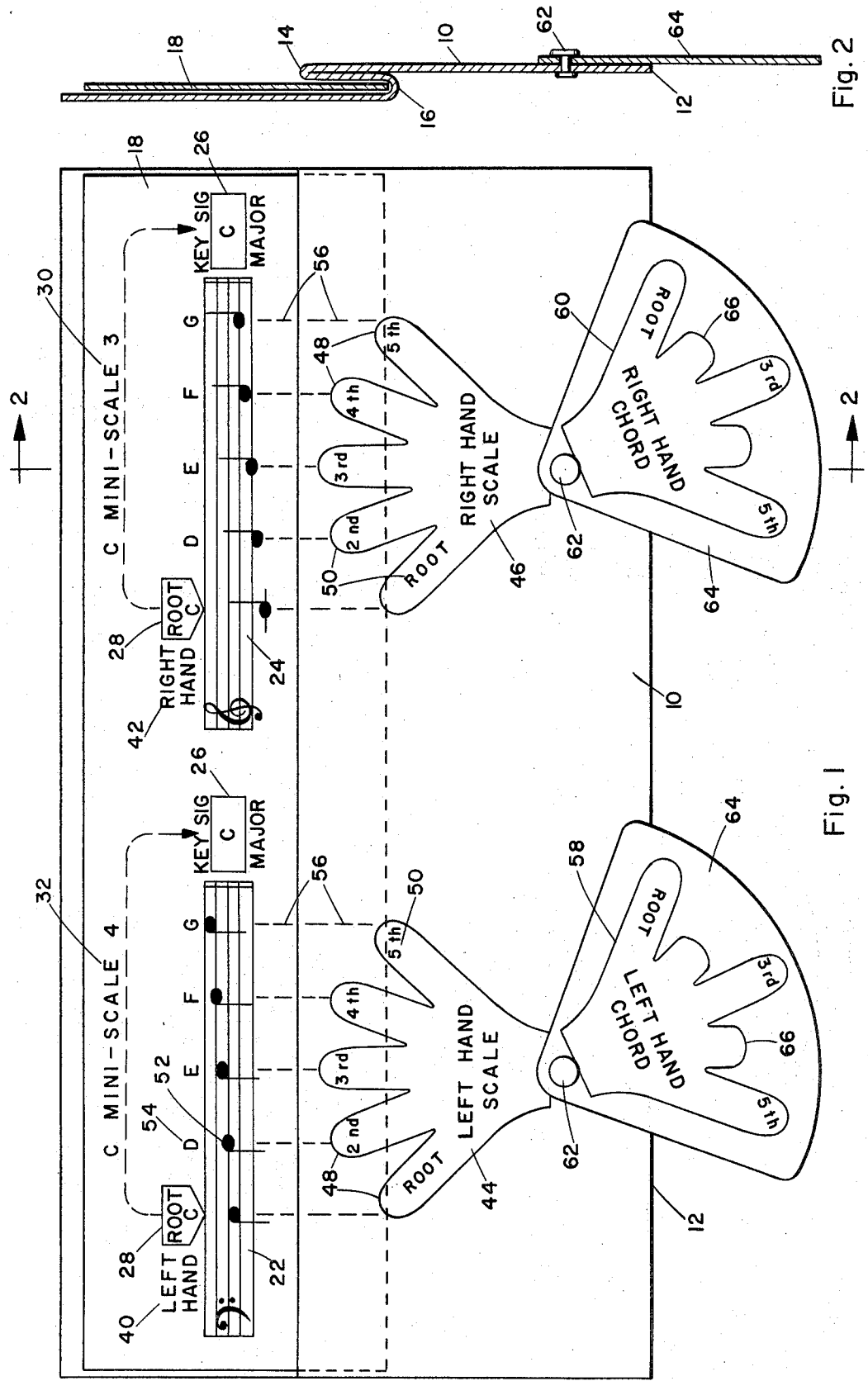

MUSIC TEACHING AID BASED ON THE HANDS AND SCALE DEGREES

BACKGROUND OF THE INVENTION

Many devices have been proposed and several commercially produced for teaching the names and values of notes and the staff notation. Scale degree and root tone terminology is not only prior art but actually represents subject matter sought to be taught by the use of the instant invention. Use of panels with replaceable inserts is also notoriously old in analogous devices. There exists a need, however, for an item which can minimize confusion in the student's mind in relating the notation in the bass clef with the notation of the treble clef, and to do this concurrently with the teaching of the names of the notes, the scale degrees and similar information in regard to at least the simple chords.

SUMMARY OF THE INVENTION

As claimed, this teaching aid is, as the title suggests, based on the student's pre-knowedge of the common names of his fingers and the order thereof, from left to right after the usual Occidental manner of reading from left to right, so that the Root of the five tone scale starting from the left is the thumb of the right hand and the little finger of the left hand, each of which is associated by visual representation and arrangement of elements of the invention with musical notation and key names. The device includes a panel with both hands thereon and replaceable strip inserts carrying musical notation in two separated sections, each section being physically as well as psychologically associated with the hands and fingers and the student cannot escape transference of the association to his own hands and fingers. The strip inserts are carried in a channel in the panel and the fingers are numbered and named for direct association with the degrees of the first, or lower five tones of a diatonic scale concurrently represented in regular notation on a strip insert juxtaposed to the fingers of each hand. To teach chords the second and fourth fingers are shortened or "knuckled under" so that only the Root, third and fifth degrees are represented as above mentioned. As illustrated these chord teaching hands are pivoted on the panel and are capable of being superimposed over the five finger hands.

BRIEF DESCRIPTION OF THE DRAWINGS

FIG. 1 is a plan view of the panel with the hands thereon and a representative strip insert in place;

FIG. 2 is a vertical sectional view taken on line 2—2 of FIG. 1;

DETAILED DESCRIPTION OF A PREFERRED EMBODIMENT

Figure 3:
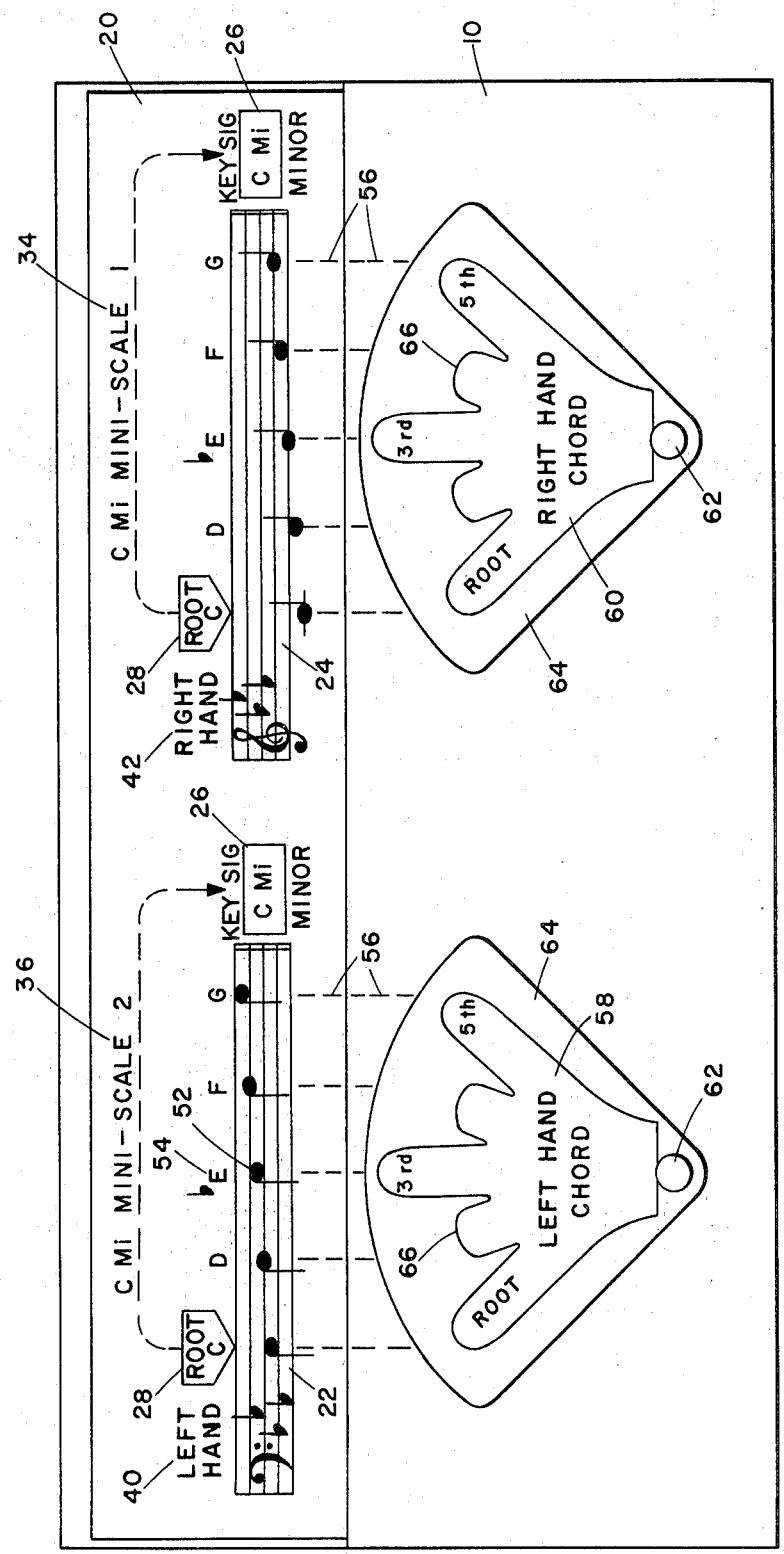
FIG. 3 is a plan view, similar to FIG. 1 but showing the chord hands in operative position and a different strip insert in place.

As illustrated, this teaching aid has a panel 10 of sheet material which can be heavy paper or plastic and ordinarily rectangular with at least one edge 12, herein considered the bottom edge, preferably rectilinear to rest on a support such as the sheet music holder of a piano or the like. The panel 10 is return folded as shown at 14 in FIG. 2 to provide a horizontal channel 16 intermediate the height of the panel and extending entirely across the panel.

A strip insert 18, which ordinarily has a length substantially equal to that of the panel 10, is removably held in said channel 16 and is one of a set, another of such set being indicated at 20 in FIG. 3. These removable and replacable strip inserts carry musical information which can be applied thereto in different ways, one way being simply by printing indicia thereon such as the conventional bass and treble staff notations indicated in the two sections 22 and 24 which sections should be noted as distinctly separate and disposed at the left and right sides of the panel, respectively, when placed in the channel 16.

Each section 22, 24 also carries visually identifiable indications of a key signature 26, the root 28, and five-note numbered scale indicators 30, 32, 34, 36, the last mentioned two scale indicators being shown in FIG. 3 wherein the strip inserts, as indicated in both strip inserts 18 and 20, the left hand section 22 and right hand section 24 have means of differentiation as such and as indicated at 40 and 42.

On the face of the panel 10 a left hand 44 and a right hand 46 are represented in any suitable manner, including but not limited to printing and these hands have somewhat stylized outstretched fingers, denominated at 48 by a common name of each finger and denominated further at 50 as the Root, 2nd, 3rd, 4th and 5th degrees of the scale, thus providing a direct teaching association between the finger name and degree of the scale and also, more importantly these concepts are related to the notes 52 and note names 54 on the sections 22 and 24. This association is further reinforced and facilitated by leaders 56 which may be printed lead lines on both the panel 10 and strip inserts, these leaders assuring proper relative positioning of the strip inserts when placed in the channel 16.

To teach chords, that is, the chords' names, scale tone components of the chords by regular notation and by note names as well as the relationship thereof to the hands, a second set of hands 58 and 60 are shown pivoted as at 62 to the panel. These hands 58 and 60 can be carried on sheet material sectors 64 and since the second and fourth degrees are not included in the simple chords shown the corresponding fingers may be shortened as indicated at 66 in FIG. 3. These hands 58 and 60 have the extended fingers thereof, named similarly to the hands 44 and 46, visually associated with the root, third and fifth of the scale appearing on the strip insert being used, such as the strip insert 20 in FIG. 3.

It is believed the purpose and functioning of this invention has been fully set out above. In recapitulation it need only be added that the user's pre-knowledge of the names of fingers and the numerical order of the first five digits is almost unconsciously applied to and interpreted in terms of the musical information to be taught. When the information has been thoroughly drilled in relation to the first five tones of the scales, it is an easy natural step for the student to extrapolate this knowledge to the remaining two tones of the scales concerned and still easier for him to extrapolate this information to reading and playing octaves above and below those represented on the strip inserts.

I claim:

1. A teaching aid based on scale degrees correlated with the fingers for teaching recognition of the first five scale tones of diatonic scales, comprising:

a panel having a set of hands simultaneously displayed thereon including a right hand and a left hand spaced apart and having the digits thereof pointing generally toward one edge of the panel, the digits of both hands having similar numerical order identification, increasing from left to right, so that the thumb of the left hand and the little finger of the right hand represent a fifth position, while the little finger of the left hand and the thumb of the right hand represent the first and root position in the scale concerned;

an elongated strip insert having a plurality of musical notations grouped thereon in two sections, each section being juxtaposed to one of said hands;

means on said panel adjacent to said one edge thereof holding said insert so that said notations are individually displayed in obviously recognizable positional relationship with said digits; and a second set of hands, said sets being mounted on said panel for selective exposure of the sets, one of said sets having only three extended digits to represent chords rather than said five tone scale.

2. A teaching aid according to claim 1 wherein said second set of hands are shiftably mounted on said panel to take the place of the first mentioned set of hands.

3. A teaching aid according to claim 2 wherein the second and fourth digits of each of said second set of hands are knuckled down, and said second set of hands are pivotally mounted on said panel.

* * * * *